Dec. 25, 1928.

A. W. CAPS 1,696,381

PHOTOGRAPHIC COPYING MACHINE

Filed June 26, 1925　　3 Sheets-Sheet 3

INVENTOR.
Arthur W. Caps.
BY Arthur C. Brown
ATTORNEY

Patented Dec. 25, 1928.

1,696,381

UNITED STATES PATENT OFFICE.

ARTHUR W. CAPS, OF KANSAS CITY, MISSOURI, ASSIGNOR TO PHOTOSTAT CORPORATION, OF PROVIDENCE, RHODE ISLAND, A CORPORATION OF RHODE ISLAND.

PHOTOGRAPHIC COPYING MACHINE.

Application filed June 26, 1925. Serial No. 39,752.

This invention relates generically to photographic copying machines, and the primary object thereof is to provide a photographic copying machine in which the holder for the sensitized sheet may be conveniently reversed to permit exposures to be made on both sides of the sheet. It is also the purpose of the invention to provide a copy-holder on the outside of the machine to hold the object to be photographed, and to so co-relate the copy-holder that when it is reversed the sensitized plate holder will be reversed to bring one of the faces of the sensitized plate in line with an object projecting apparatus such as a camera or the like.

The invention is illustrated as a duplex copying machine employing two projecting apparatuses or cameras arranged in horizontal alignment, there being a sensitized-sheet holder pivoted within the casing of the machine between the two cameras so that the holder may be swung into alternate alignment with the respective cameras, and in order to effect the operation of the holder I use a reversible copy-holder outside of the machine pivoted in vertical alignment with the space between the two cameras so that the copy-holder may be brought into vertical alignment with either of the cameras to present the object to be photographed on the proper side of the sensitized sheet. Such machines are employed for copying page after page of a book, and since the pages of books are usually printed on both sides, it is desirable to synchronize the movement of the sensitized plate holder with reversing movement of the copy-holder, so I have provided synchronizing mechanism between the copy-holder and the sheet-holder, so co-related with the copy-holder and the sheet-holder that one will partake of the movement of the other.

The specific construction of the embodiment of my invention selected for illustration will be specifically described hereinafter, reference being had to the accompanying drawings, in which—

Figure 1:
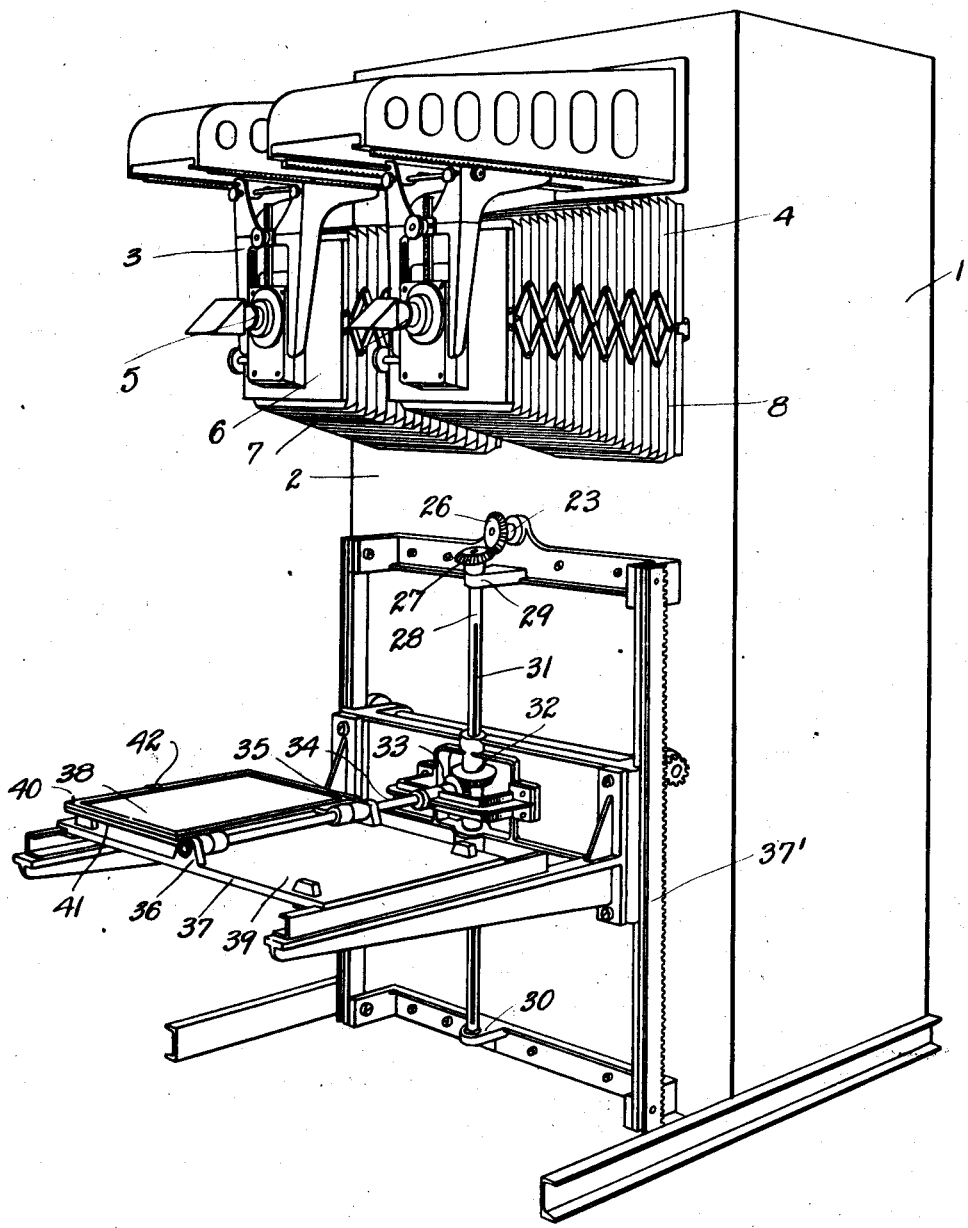
Fig. 1 is a perspective view of a photographic copying machine constructed in accordance with my invention.
Figure 2:
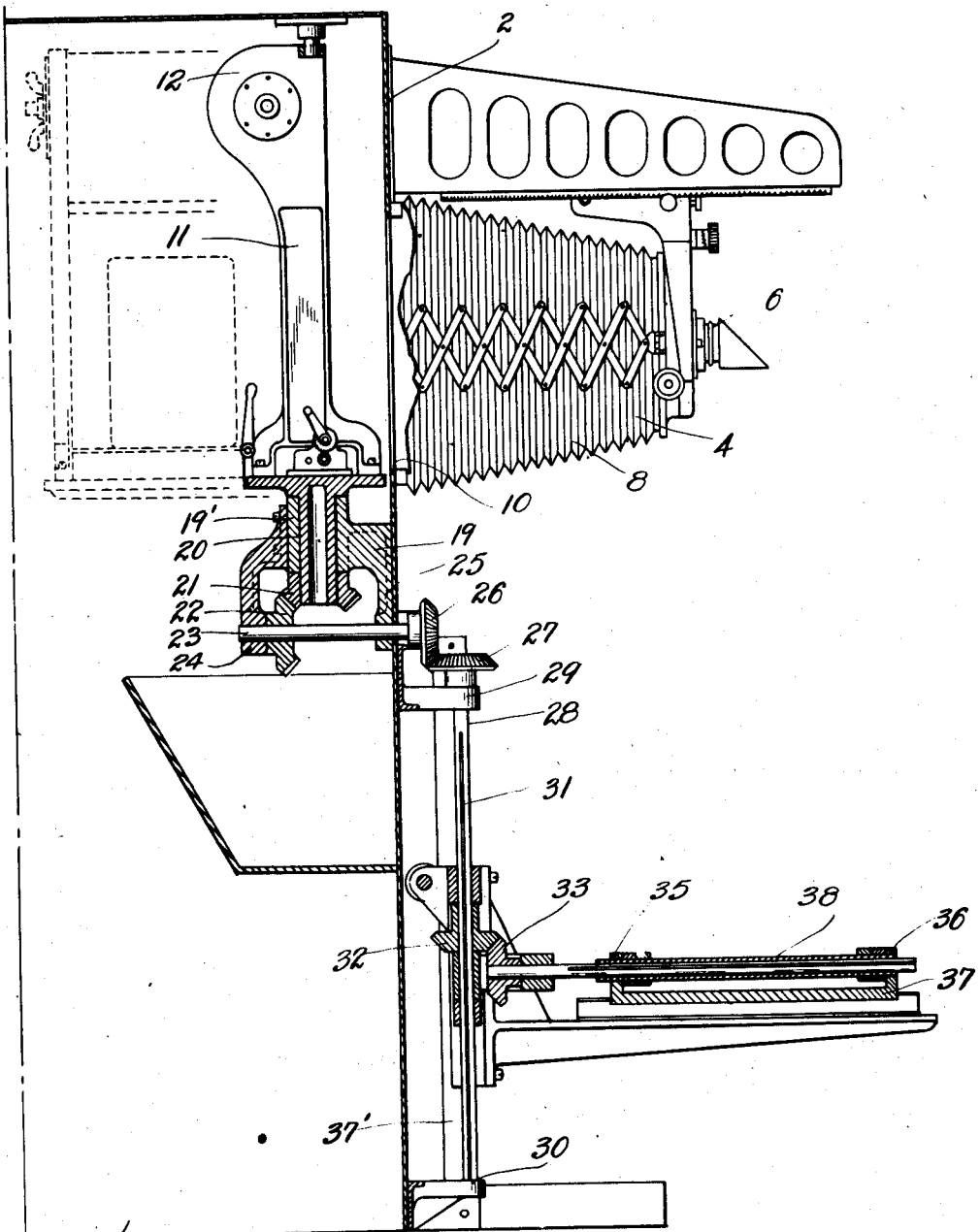
Fig. 2 is a vertical, longitudinal, sectional view through the same.
Figure 3:
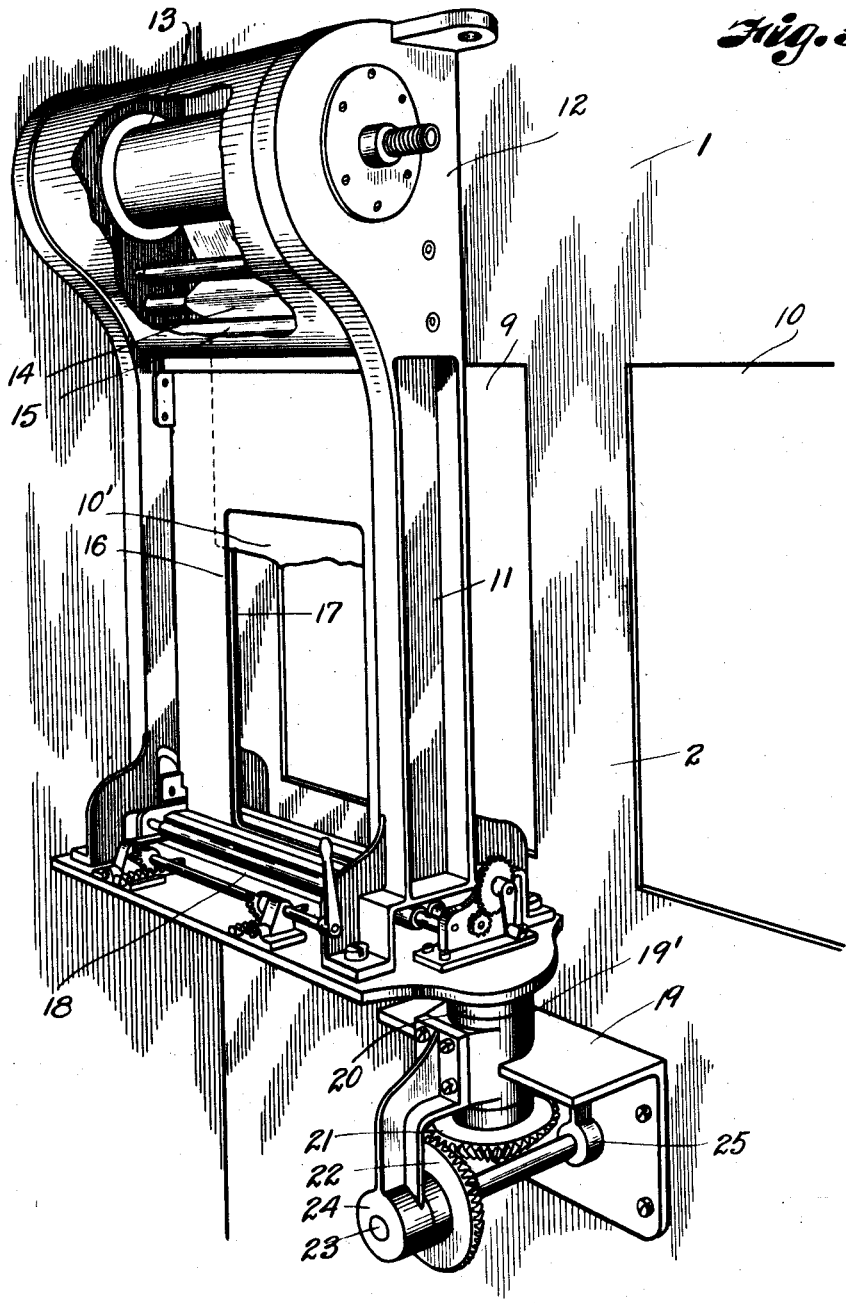
Fig. 3 is an enlarged, perspective view of the sensitized-sheet holder.

Referring now to the drawings by numerals of reference, 1 designates the casing or housing of the photographic copying machine. On the front face or panel 2 of the housing or casing, are two object projecting apparatuses 3 and 4 shown as cameras of appropriate construction. These are provided with the usual lenses 5 and 6, and the usual appurtenances common to cameras. The bellows 7 and 8 align with windows or openings 9 and 10 in the front panel 2 so that the objects to be photographed can be projected upon a sensitized sheet supported by a holder 11 within the casing 1, so mounted that it may be reversible to align first with the window 9 and then with the window 10 to permit both sides of the sensitized sheet 10′ to be exposed to the projecting apparatuses. The sensitized-sheet holder is shown as comprising a substantially rectangular frame in the top of which is a housing 12 to receive a spool 13 on which a strip 14 of sensitized paper, cloth or the like may be wound. The sheet may pass over the idler roller 15 between the members 16 and 17 of a mask to a cutting apparatus 18 so that the sheet or strip may be severed at the proper time. In so far as this invention is concerned, however, the particular construction of the sheet-holder is unimportant, it being obvious that instead of feeding the sheets from a strip that the separate sheets can be introduced into the sheet-holder for each double exposure, so I deem it unnecessary to elaborate in this description upon the particular construction of the sheet-holder per se.

In line with the space between the two openings 9 and 10 within the casing 1 is a bracket 19 having a vertical bearing 19′ in which is rotatably mounted a spindle 20 fast to one corner of the frame 11. The spindle projects through the bearing and carries at its free end a mitre gear 21 which meshes with a similar gear 22 on the shaft 23 mounted in the depending bearings 24 and 25 carried by the bracket 19. One end of the shaft 23 projects through the front panel 2 of the casing. The projecting end carries a mitre gear 26 meshing with a like gear 27 on the vertical shaft 28 mounted in the bearings 29 and 30 on the front panel 2 of the casing 1. The shaft 28 is provided with a groove 31 engaged by a projection or a key on the hub of the gear 32 wihch is slidable on the shaft 28. The gear 32 meshes with a gear 33 on the shaft 34 in bearings 35 and 36 carried by the table 37. The table is adjustable vertically on the frame 37' so that the copy-holder 38, rigidly secured at one edge to the shaft 34, may be focused with respect to the cameras 3 and 4. The copy-holder may also be moved back and forth so that it will align with the prism or lens when the camera is focused.

It will be obvious that the shaft 34 is in vertical alignment with the space between the two cameras 3 and 4. Consequently, when the copy-holder is swung to one side of its pivot or shaft 34 it will align with the lens of the camera 3, and when swung to the opposite side it will align with the camera 4. Since the copy-holder 38 will rock the shaft 34, 180° when it is swung from left to right as shown in Fig. 1, the shaft 28 will be partially rotated through the same arc, like motion being communicated to the shaft 23 so that the spindle 19 will be rotated through an arc of 180°, swinging the sensitized-sheet holder 11 through an arc of 180°, or from one window to the other, that is, if the sheet-holder is opposite window 9 when the copy-holder is in the position shown in Fig. 1, it will be in line with the window 10 when the copy-holder is swung over upon the portion 39 of the table 37 and vice versa.

The synchronizing movements of the copy-holder and the sheet-holder are due to the fact that all of the gears are of the same diameter and have the same number of teeth. The copy-holder can be constructed of two hinged members 40 and 41 with transparent panels secured together by a suitable clip 42. Therefore, if the object to be photographed is a sheet with printing on both sides, or two sheets each printed on one side only, with the plain side of one sheet opposite the plain side of the other, it will be obvious that the printed matter will be visible through both panels; and if the sheet in the holder 11 is sensitized on both faces or sides, it must follow that the objects visible through the respective panels may be photographed on opposite sides of the sensitized sheet, if an exposure is made first on one side of the copy-holder and then on the other. Since means has been provided for synchronizing the movements of the copy-holder, liability of making two exposures on one face of the sensitized sheet will be entirely eliminated.

In this application I have not shown in detail the mechanism for vertically adjusting the table which supports the copy-holder because this may form the subject matter of a separate application, it being apparent that in so far as this application is concerned it is immaterial whether or not the cameras have fixed focuses, this particular invention residing more specifically in the synchronizing movements of the two elements, to wit, the holder for carrying the sensitized material on which the exposure is to be made, and the copy-holder which carries the object to be photographed.

What I claim and desire to secure by Letters-Patent is—

1. In a photographic copying machine, the combination with a camera body embodying a casing and a lens, and a reversible copy-holder arranged outside of the casing in the focus of the lens, of a reversible sensitized sheet holder within the casing adapted to be moved into and out of the focal plane of the lens and gearing connecting the sheet holder and copyholder to effect joint movement thereof.

2. In a photographic copying machine, a casing having two object projecting apparatuses arranged side by side, a sensitized-paper holding box within the casing mounted to alternately swing into line with first one projecting apparatus and then with the other, a reversible copy holder outside the casing, and mechanical connections between the copy-holder and the paper holding box to cause movement of the paper box in response to movement of the copy-holder.

3. In a photographic copying machine, a casing having two object-projecting apparatuses arranged side by side, a sensitized-paper holding box within the casing mounted to alternately swing into line with the respective projecting apparatuses, a reversible copy-holder outside the casing, and mechanical connections between the copy-holder and the paper holding box to synchronize the movements of the paper holding box with those of the copy-holder.

4. In a photographic copying machine, the combination with a camera body and a pair of lenses having parallel axes, of a reversible holder for sensitized material within the casing adapted to move alternatively within the focal planes of the respective lenses to prevent one of its sensitive sides to one and its other sensitive side to the other, and a reversible copyholder arranged outside of the casing and adapted to be moved into position at the focal point of first one lens and then the other.

5. In a photographic copying machine, the combination with a camera body and a pair of lenses having parallel axes, of a reversible holder for sensitized material within the casing adapted to move alternatively within the focal planes of the respective lenses to prevent one of its sensitive sides to one and its other sensitive side to the other a reversible copyholder arranged outside of the casing and adapted to be moved into position at the focal point of first one lens and then the other, and gearing connecting the sheet holder and copy holder to effect joint movement thereof.

6. In a photographic copying machine, the combination with a camera body embodying a casing, and a pair of lenses having parallel axes, of a holder for sensitized material pivotally mounted within the casing between the axes of the lenses and adapted to be swung so as to present one side of the sheet held therein in the focal plane of one lens or the other side of the sheet in the focal plane of the other lens.

7. In a photographic copying machine, a casing having object projecting apparatus, a reversible holder for sensitized material within the casing, a reversible copy-holder outside the casing, and means co-operating with the copy-holder and the first named holder for causing the first named holder to be reversed when the copy holder is reversed, said means comprising connected gearing.

8. In a photographic copying machine, the combination with a camera body embodying a casing and a lens, of a holder for a sheet of sensitive material pivotally mounted entirely within the casing on an offset axis to swing a sheet held therein bodily into and out of the focal plane of the lens, the holder being housed in a light tight manner entirely within the casing in both positions.

9. In a photographic copying machine, a casing having two object-projecting apparatuses arranged side by side, a sensitized-paper box within the housing mounted to alternately swing in line with first one object-projecting apparatus and then the other, a swinging copy-holder outside the casing, and mechanical connections between the copy-holder and the paper box for synchronizing the swinging movements of the paper box with those of the copy-holder.

10. In a photographic copying machine, a casing, a reversible sensitized-sheet holder in the casing, a bracket in the casing, a spindle on the frame in a bearing in the bracket, a gear on the spindle, a stub shaft at an angle to the spindle, a gear on the stub shaft meshing with the gear on the spindle, a gear on one end of the stub shaft outside the casing, a shaft outside the casing meshing with the last named gear, and means for rotating the last named shaft.

11. In a photographic copying machine, a casing, a reversible sensitized-sheet holder in the casing, a bracket in the casing, a spindle on the frame in a bearing in the bracket, a gear on the spindle, a stub shaft at an angle to the spindle, a gear on the stub shaft meshing with the gear on the spindle, a gear on one end of the stub shaft outside the casing, a shaft outside the casing meshing with the last named gear, another gear on the last named shaft, a reversible copy-holder outside the casing, comprising a frame and a rock shaft rigid therewith, and a gear on the rock shaft meshing with the second mentioned gear on the shaft outside the casing.

12. In a photographic copying machine, a casing, a reversible sensitized-sheet holder in the casing, a bracket in the casing, a spindle on the frame in a bearing in the bracket, a gear on the spindle, a stub shaft at an angle to the spindle, a gear on the stub shaft meshing with the gear on the spindle, a gear on one end of the stub shaft outside the casing, a shaft outside the casing meshing with the last named gear, another gear on the last named shaft, a reversible copy-holder outside the casing comprising a frame and a rock shaft rigid therewith, a gear on the rock shaft meshing with the second mentioned gear on the shaft outside the casing, and a table supporting the rock shaft and the copy-holder.

13. In a photographic copying machine, a casing, a reversible sensitized-sheet holder in the casing, a bracket in the casing, a spindle on the frame in a bearing in the bracket, a gear on the spindle, a stub shaft at an angle to the spindle, a gear on the stub shaft meshing with the gear on the spindle, a gear on one end of the stub shaft outside the casing, a shaft outside the casing meshing with the last named gear, another gear on the last named shaft, a reversible copy-holder outside the casing comprising a frame and a rock shaft rigid therewith, a gear on the rock shaft meshing with the second mentioned gear on the shaft outside the casing, and a table supporting the rock shaft and the copy-holer, said table supported on the front wall of the casing.

In testimony whereof I affix my signature.

ARTHUR W. CAPS.